US012472691B2

United States Patent
Libinson et al.

(10) Patent No.: US 12,472,691 B2
(45) Date of Patent: Nov. 18, 2025

(54) SYSTEM AND METHOD OF PRINTING THREE-DIMENSIONAL OBJECTS HAVING IMPROVED SURFACE PROPERTIES

(71) Applicant: STRATASYS LTD., Rehovot (IL)

(72) Inventors: Alexander Libinson, Holon (IL); Vitali Krasnopolsky, Rishon Lezion (IL); Yuval Frid, Ness Ziona (IL); Karin Dekel, Kefar Shmuel (IL); Shoval Silbert, Rehovot (IL)

(73) Assignee: STRATASYS LTD., Rehovot (IL)

( * ) Notice: Subject to any disclaimer, the term of this patent is extended or adjusted under 35 U.S.C. 154(b) by 74 days.

(21) Appl. No.: 18/030,083

(22) PCT Filed: Oct. 11, 2021

(86) PCT No.: PCT/IL2021/051213
§ 371 (c)(1),
(2) Date: Apr. 4, 2023

(87) PCT Pub. No.: WO2022/079711
PCT Pub. Date: Apr. 21, 2022

(65) Prior Publication Data
US 2023/0373163 A1    Nov. 23, 2023

Related U.S. Application Data

(60) Provisional application No. 63/090,444, filed on Oct. 12, 2020.

(51) Int. Cl.
*B29C 64/40*      (2017.01)
*B29C 64/112*    (2017.01)
(Continued)

(52) U.S. Cl.
CPC .......... *B29C 64/336* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS

| 7,604,768 B2 | 10/2009 | Kritchman |
| 2003/0083771 A1 | 5/2003 | Schmidt |

(Continued)

FOREIGN PATENT DOCUMENTS

| JP | 2015150840 | 8/2015 |

OTHER PUBLICATIONS

Katia Studer et al; Overcoming oxygen inhibition in UV-curing of acrylate coatings by carbon dioxide inerting: Part I; Progress in Organic Coatings 48 (2003) 92-100.

(Continued)

*Primary Examiner* — Yung-Sheng M Tsui
(74) *Attorney, Agent, or Firm* — PEARL COHEN ZEDEK LATZER BARATZ LLP

(57) ABSTRACT

A method of printing a three-dimensional object (90) including: providing a 3D inkjet printing system including: a printing chamber (162) accommodating a printing unit (120) having an inkjet printing head and a curing subunit (124), and a supply unit (130) including a modeling material and a support material; and printing the 3D object (90) in multiple consecutive layers according to a predefined printing sequence, wherein for at least one of the multiple consecutive layers the predefined printing sequence for the same respective layer includes depositing and curing the modeling material and the support material separately from each other either in time or in space. Some embodiments may include controlling a concentration of oxygen in the printing chamber (162) to be in a predefined oxygen concentration range.

(Continued)

Some embodiments may include controlling a temperature in the printing chamber (162) to be in a predefined temperature range.

19 Claims, 6 Drawing Sheets

(51) Int. Cl.
  *B29C 64/209* (2017.01)
  *B29C 64/336* (2017.01)
  *B29C 64/371* (2017.01)
  *B33Y 10/00* (2015.01)
(52) U.S. Cl.
  CPC ............ *B29C 64/371* (2017.08); *B29C 64/40* (2017.08); *B33Y 10/00* (2014.12)

(56) References Cited

U.S. PATENT DOCUMENTS

| | | |
|---|---|---|
| 2005/0023719 A1 | 2/2005 | Nielsen et al. |
| 2006/0192322 A1* | 8/2006 | Abe .................... B29C 64/153 |
| | | 264/497 |
| 2015/0183160 A1* | 7/2015 | Ohnishi .................. B29C 64/40 |
| | | 264/129 |
| 2016/0207147 A1* | 7/2016 | Van Hassel ............. B22F 12/70 |
| 2018/0126651 A1 | 5/2018 | Matsumura et al. |
| 2018/0200945 A1* | 7/2018 | Ochi ..................... B29C 64/209 |
| 2019/0039321 A1* | 2/2019 | Matzner ................. B33Y 10/00 |
| 2020/0079006 A1 | 3/2020 | Kindt-Larsen et al. |
| 2022/0402215 A1* | 12/2022 | Liu ....................... B29C 64/118 |
| 2024/0009739 A1* | 1/2024 | Mansell ................. B22F 10/77 |

OTHER PUBLICATIONS

Katia Studer et al; Overcoming oxygen inhibition in UV-curing of acrylate coatings by carbon dioxide inerting: Part II; Progress in Organic Coatings 48 (2003) 101-111.

Samuel Clark Ligon et al; Strategies to Reduce Oxygen Inhibition in Photoinduced Polymerization.; Chem. Rev., 2014, v.114, 1, 557-589.

Partial International Search Report dated Jan. 19, 2022 for PCT Application No. PCT/IL2021/051213.

International Search Report dated Apr. 4, 2022 for PCT Application No. PCT/IL2021/051213.

* cited by examiner

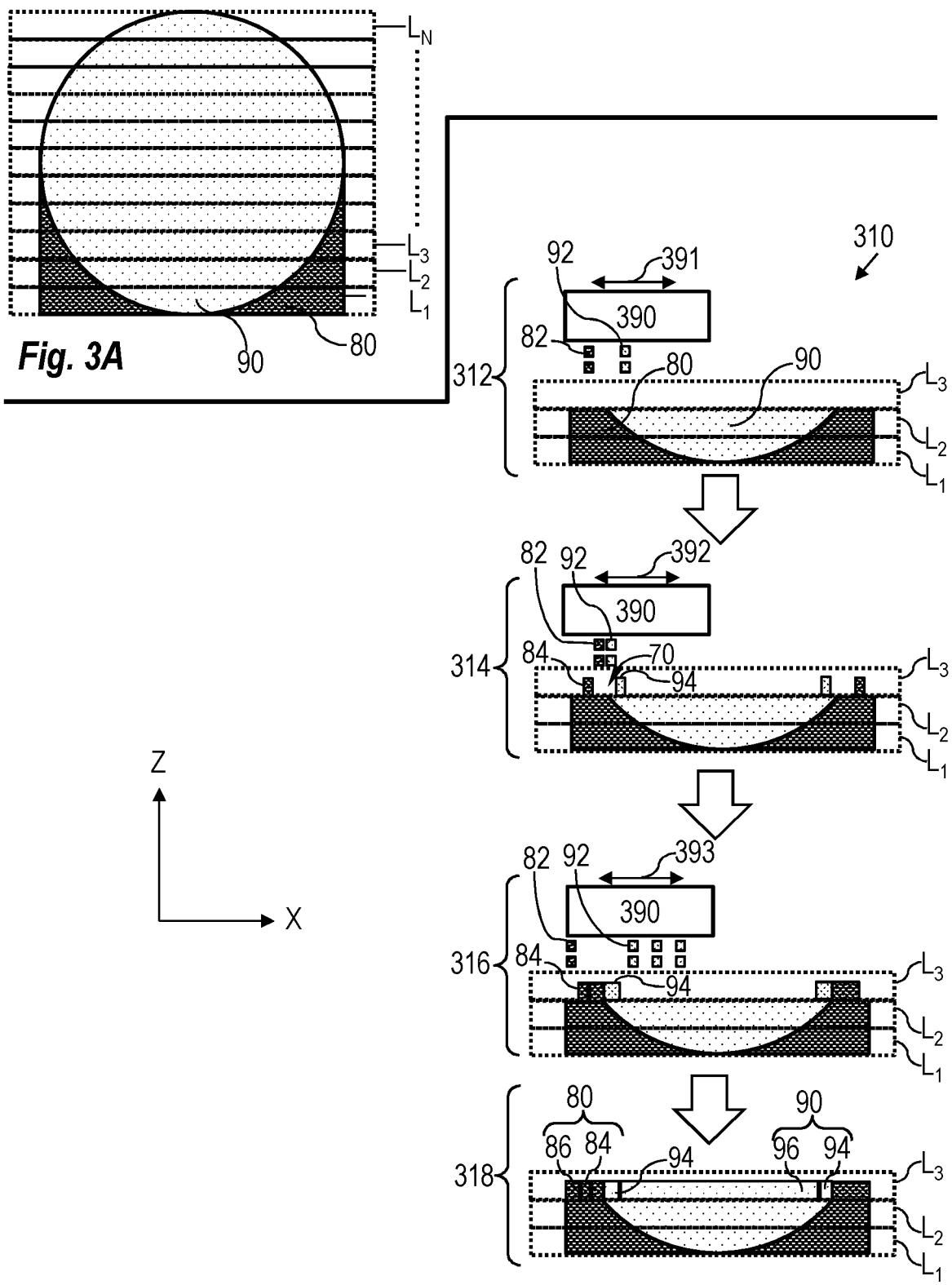

SYSTEM AND METHOD OF PRINTING THREE-DIMENSIONAL OBJECTS HAVING IMPROVED SURFACE PROPERTIES

CROSS-REFERENCE TO RELATED APPLICATIONS

This application is a National Phase Application of PCT International Application No. PCT/IL2021/051213, International Filing Date Oct. 11, 2021, claiming the benefit of U.S. Provisional Patent Application No. 63/090,444, filed Oct. 12, 2020 which are hereby incorporated by reference.

FIELD OF THE INVENTION

The present invention relates to the field of three-dimensional (3D) inkjet printing, and more particularly, to systems and methods of printing 3D objects having improved surface properties.

BACKGROUND OF THE INVENTION

Typically, printing of a 3D object using a 3D inkjet printing system includes deposition of at least two different liquid building materials, such as a modeling material and a support material, onto a fabrication tray or surface on a layer by layer basis. Typically, a modeling material is used for forming the 3D object and a support material is used for forming a support structure for supporting portions of the 3D object during the fabrication process. Elements of modeling material may be deposited within support structures, for added support strength. The support structures are typically removed after the fabrication process is complete to provide the final 3D object.

When the modeling material and the support material come into contact in a liquid or not fully cured state, a mix layer of both modeling material and support material may form at an interface therebetween. This may, for example, result in a matte appearance of an external surface of the final 3D object, after removal of the support structure. This may also result in, for example, micro-scratches and/or inconsistencies on the surface of the 3D object after removal of the support structure, which may negatively impact the surface appearance of the final 3D object and/or result in reduced mechanical properties of the final 3D object.

SUMMARY OF THE INVENTION

Some embodiments of the present invention provide a method of printing a three-dimensional (3D) object, the method including: providing a 3D inkjet printing system including: (i) a printing chamber accommodating a printing unit having an inkjet printing head and a curing subunit, and (ii) a supply unit including a modeling material and a support material; and printing the 3D object in multiple consecutive layers according to a predefined printing sequence, wherein for at least one of the multiple consecutive layers the predefined printing sequence for the same respective layer includes depositing and curing the modeling material and the support material separately from each other either in time or in space.

In some embodiments, for at least one of the multiple consecutive layers the predefined printing sequence for the same respective layer includes depositing and curing the modeling material and the support material one after the other.

In some embodiments, for at least one of the multiple consecutive layers the predefined printing sequence for the same respective layer includes depositing and curing each of the modeling material and the support material in different deposition scans/travels of the printing unit.

In some embodiments, for at least one of the multiple consecutive layers the predefined printing sequence for the same respective layer includes: at a first stage, depositing and curing the modeling material in one or more deposition scans/travels of the printing unit, and at a second stage, depositing and curing the support material in one or more additional deposition scans/travels of the printing unit.

In some embodiments, for at least one of the multiple consecutive layers the predefined printing sequence for the same respective layer includes: at a first stage, depositing and curing the support material in one or more deposition scans/travels of the printing unit, and at a second stage, depositing and curing the modeling material in one or more additional deposition scans/travels of the printing unit.

In some embodiments, for at least one of the multiple consecutive layers the predefined printing sequence for the same respective layer includes: at a first stage, depositing and curing the support material and the modeling material to form a contour region of a support structure and at least a contour region of the 3D object of the respective layer, respectively, such that the contour of the support structure and at least the contour of the 3D object are separated by a vacant space therebetween; and at a second stage, depositing and curing at least one of the support material and the modeling material in the vacant space.

In some embodiments, for at least one of the multiple consecutive layers the predefined printing sequence for the same respective layer further includes depositing and curing the modeling material so as to form a bulk region of the 3D object.

In some embodiments, for at least one of the multiple consecutive layers the predefined printing sequence for the same respective layer further includes depositing and curing the support material so as to form a bulk region of the support structure.

In some embodiments, for at least one of the multiple consecutive layers the predefined printing sequence for the same respective layer further includes depositing and curing both the modeling material and the support material in one or more deposition scans/travels of the printing unit.

In some embodiments, the method includes controlling a concentration of oxygen in the printing chamber to be in a predefined oxygen concentration range of 1% to 10%, 2% to 8%, or 3% to 5%.

In some embodiments, the method includes controlling a temperature in the printing chamber to be in a predefined temperature range of 15° C. to 35° C. or 20° C. to 30° C.

Some embodiments of the present invention provide a method of printing a three-dimensional object, the method including: providing a 3D inkjet printing system including: (i) a printing chamber accommodating a printing unit having an inkjet printing head and a curing subunit, and (ii) a supply unit including a modeling material and a support material; and printing the 3D object in multiple consecutive layers according to a predefined printing sequence, wherein for at least one of the multiple consecutive layers the predefined printing sequence for the same respective layer includes depositing and curing the modeling material and the support material one after the other.

In some embodiments, for at least one of the multiple consecutive layers the predefined printing sequence for the same respective layer includes depositing and curing each of the modeling material and the support material in different deposition scans/travels of the printing unit.

In some embodiments, for at least one of the multiple consecutive layers the predefined printing sequence for the same respective layer includes: at a first stage, depositing and curing the modeling material in one or more deposition scans/travels of the printing unit, and at a second stage, depositing and curing the support material in one or more additional deposition scans/travels of the printing unit.

In some embodiments, for at least one of the multiple consecutive layers the predefined printing sequence for the same respective layer includes: at a first stage, depositing and curing the support material in one or more deposition scans/travels of the printing unit, and at a second stage, depositing and curing the modeling material in one or more additional deposition scans/travels of the printing unit.

In some embodiments, the method further includes controlling a concentration of oxygen in the printing chamber to be in a predefined oxygen concentration range of 1% to 10%, 2% to 8%, or 3% to 5%.

In some embodiments, the method further includes controlling a temperature in the printing chamber to be in a predefined temperature range of 15° C. to 35° C. or 20° C. to 30° C.

Some embodiments of the present invention provide a method of printing a three-dimensional object, the method including: providing a 3D inkjet printing system including: (i) a printing chamber accommodating a printing unit having an inkjet printing head and a curing subunit, and (ii) a supply unit including a modeling material and a support material; and printing the 3D object in multiple consecutive layers according to a predefined printing sequence, wherein for at least one of the multiple consecutive layers the predefined printing sequence for the same respective layer includes: at a first stage, depositing and curing the support material and the modeling material to form a contour region of a support structure and at least a contour region of the 3D object of the respective layer, respectively, such that the contour of the support structure and at least the contour of the 3D object are separated by a vacant space therebetween; and at a second stage, depositing and curing at least one of the support material, the modeling material or a combination thereof in the vacant space.

In some embodiments, for at least one of the multiple consecutive layers the predefined printing sequence for the same respective layer further includes depositing and curing the modeling material so as to form a bulk region of the 3D object.

In some embodiments, for at least one of the multiple consecutive layers the predefined printing sequence for the same respective layer further includes depositing and curing the support material so as to form a bulk region of the support structure.

In some embodiments, for at least one of the multiple consecutive layers the predefined printing sequence for the same respective layer further includes depositing and curing both the modeling material and the support material in one or more deposition scans/travels of the printing unit.

In some embodiments, the method further includes controlling a concentration of oxygen in the printing chamber to be in a predefined oxygen concentration range of 1% to 10%, 2% to 8%, or 3% to 5%.

In some embodiments, the method further includes controlling a temperature in the printing chamber to be in a predefined temperature range of 15° C. to 35° C. or 20° C. to 30° C.

Some embodiments of the present invention may provide a method of printing a three-dimensional (3D) object, the method including: providing a 3D inkjet printing system including: (i) a printing chamber accommodating a printing unit having an inkjet printing head and a curing subunit, (ii) a supply unit including a modeling material and a support material, (iii) an inert gas source in fluid communication with the printing chamber, and (iv) a controller for controlling a concentration of oxygen in the printing chamber to be within a predefined oxygen concentration range below its content in the ambient atmosphere, printing the 3D object in multiple consecutive layers according to a predefined printing sequence.

In some embodiments, the 3D inkjet printing system further includes a controllable valve and a sensor providing readings indicative of a concentration of oxygen in the printing chamber, and wherein the controller controls the valve to jet inert gas from the inert gas source into the printing chamber based on readings of the sensor.

In some embodiments, the inert gas source includes a balloon with a compressed inert gas, or a gas generator configured to generate the inert gas from air.

In some embodiments, the inert gas includes nitrogen.

In some embodiments, the sensor is positioned within the printing chamber.

In some embodiments, the predefined oxygen concentration is 1% to 10%, 2% to 8%, or 3% to 5%.

In some embodiments, the controller further controls a temperature in the printing chamber to be within a predefined temperature range.

In some embodiments, the predefined temperature range is 15° C. to 35° C., or 20° C. to 30° C.

In some embodiments, the 3D inkjet printing system further includes a cooling system.

In some embodiments, the cooling system includes a pump.

In some embodiments, the cooling system is in fluid communication with the printing chamber.

In some embodiments, the cooling system draws gases from the printing chamber via one or more outlets, cools the gases and returns the cooled gases to the printing chamber via one or more inlets.

In some embodiments, the controller controls cooling system to maintain the temperature in the printing chamber to be within the predefined temperature range based on the readings of the sensor.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 3A is a schematic illustration of a 3D object and a support structure printable using a 3D inkjet printing system, according to some embodiments of the invention;

FIG. 3B schematically shows a process of printing a 3D object by separated spatial deposition of a modeling material and support material during the printing of the same respective layer, according to some embodiments of the invention;

Figure 1:
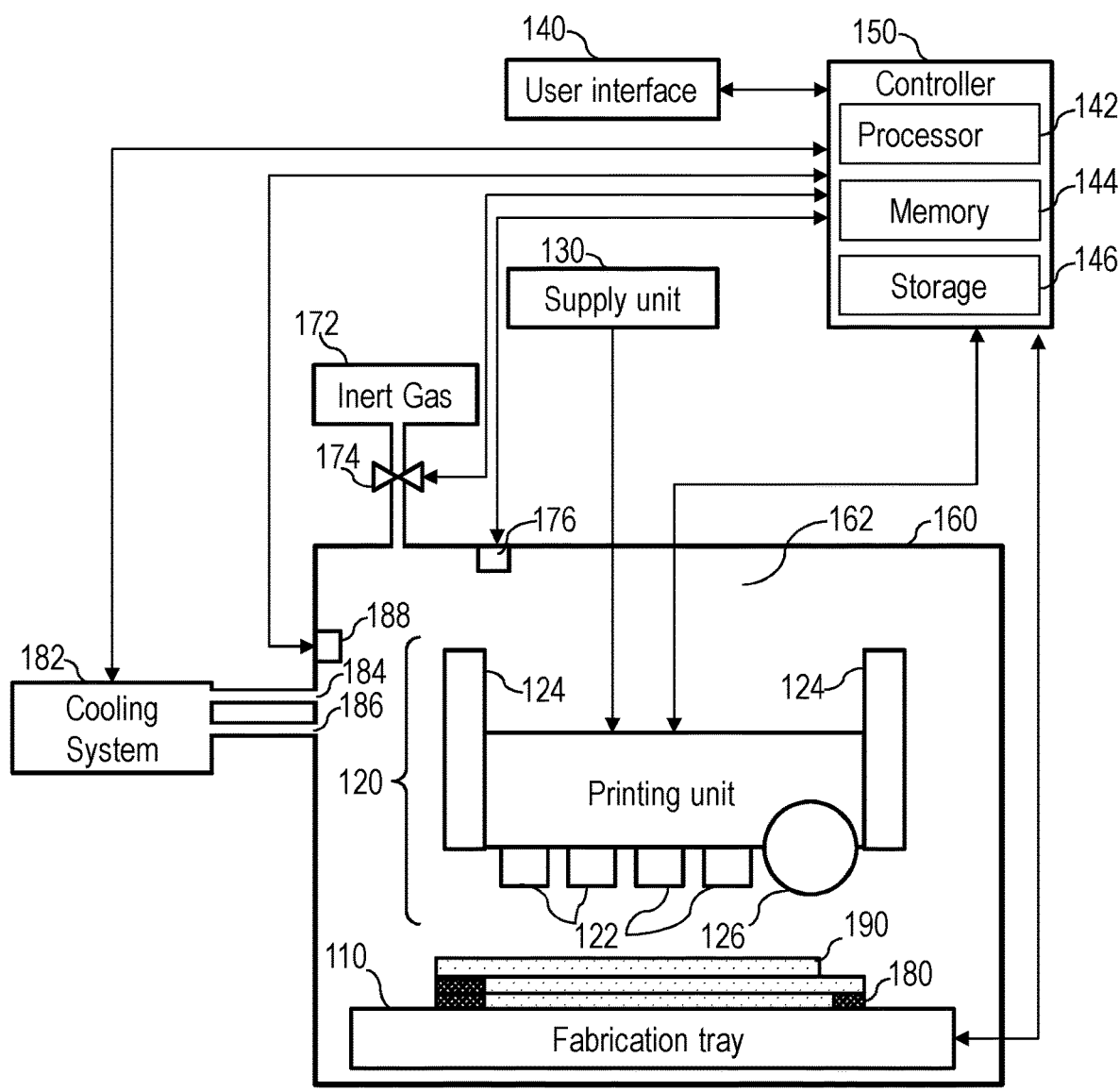
FIG. 1 is a schematic illustration of a 3D inkjet printing system for printing 3D objects, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

A 3D inkjet printing system according to some embodiments of the present invention may be configured to print a 3D object and a support structure for the 3D object being printed, layer-by-layer, by selectively jetting building materials, such as a modeling material and a support material, from one or more inkjet print heads, and depositing the building materials onto a fabrication tray or surface in multiple consecutive layers according to a predefined printing sequence as defined by a software file or any other set of data generated during printing by the software. The 3D inkjet printing system may be configured to print at least one of the multiple consecutive layers by depositing and curing the modeling material and the support material separately from each other, either in time or in space, so as to significantly reduce a contact and resulting mixing between uncured, or not fully cured, modeling and support materials. This may reduce a thickness of a resulting mix layer at an interface between the modeling material and the support material, as compared to 3D inkjet printing methods which typically concurrently deposit and cure both the modeling material and the support material when printing a layer comprising both materials.

In various embodiments, the 3D inkjet printing system may be configured to provide controllable environmental conditions during the printing of the 3D object. For example, the 3D inkjet printing system may control a concentration of oxygen in a printing chamber thereof to be in a predefined oxygen concentration range and/or to control a temperature in the printing chamber to be in a predefined temperature range. The predefined oxygen concentration range may be controlled to be below its content or concentration in the ambient atmosphere. The predefined oxygen concentration range and/or the predefined temperature range may be set to further reduce the thickness of the mix layer at the interface between the modeling and support materials as compared to current 3D inkjet printing methods which are typically performed in ambient conditions.

The disclosed systems and methods may significantly reduce the thickness of the mix layer that may form at the interface between the modeling material and the support material during the printing of the 3D object and its support structure/s. This may provide 3D objects with significantly glossier external surfaces, and/or 3D objects having improved mechanical properties compared to 3D objects being printed using current typical 3D inkjet printing methods.

Reference is now made to FIG. 1, which is a schematic illustration of an exemplary 3D inkjet printing system 100 for printing 3D objects, according to some embodiments of the invention.

According to some embodiments, 3D inkjet printing system 100 may include a fabrication tray 110, a printing unit 120, a supply unit 130, a user interface 140 and a controller 150. Controller 150 may be configured to control all elements of 3D inkjet printing system 100.

Fabrication tray 110 may be any tray, fabrication or printing surface that is suitable to bear 3D objects and their corresponding support constructions as they are being printed, e.g., fabricated. A fabrication surface or printing surface may include a previously printed layer or layers of the 3D object and/or its support construction/s. Fabrication tray 110 may be an X-Y, i.e. flat surface and may be controlled, e.g., by controller 150, to move in the Z direction and/or optionally in the X-Y plane according to the requirements of the printing process. In some embodiments, fabrication tray 110 may be a circular tray configured to rotate around a central axis and to optionally move in the Z direction. In some embodiments, fabrication tray 110 may be static. In some embodiments, fabrication tray 110 may be mobile (e.g. a rotary fabrication tray, or moving in the X, Y and/or Z directions).

Printing unit 120 may include one or more print heads 122, one or more hardening or curing subunits 124, and one or more leveling subunits 126. Print heads 122 may be adapted to deposit building materials using any inkjet printing method. Printing unit 120 may move horizontally in both X and Y directions and optionally also vertically in the Z direction, above a square or rectangular fabrication tray 110. In some other embodiments, printing unit 120 may move radially and optionally also vertically in the Z direction above a circular fabrication tray 110. In various embodiments, some or all of the elements of printing unit 120 (e.g., printing heads 122, hardening or curing unit 124, leveling subunit 126) may be mounted at distinct locations of printing system 100 and may be either static or mobile.

Each print head 122 may deposit one or more building materials. For example, a print head 122 may be capable of depositing one, two or more materials in a single deposition scan/travel. Print head(s) 122 may be fed with the building material(s) supplied by supply unit 130. As known in the art, the term "print head" or "3D printing head" refers to a hardware component that is suitable to dispense the building material(s) at a predefined position on the fabrication tray or surface Implementations of commercially available 3D printing heads may include a single channel (e.g., holding a single type or color of printing material) or a multiple channel (e.g., holding one or more types or colors of printing materials). In some embodiments, a single print head of print heads 122 may be configured to deposit different materials (e.g., a dual channel print head, a multiple channel print head), each material being deposited via a separate array of inkjet print head nozzles (not shown).

Hardening or curing subunit(s) 124 may include any device that is adapted to emit light, heat and the like that may cause the printed building material to harden. For example, hardening subunit(s) 124 may include one or more ultraviolet (UV) lamps (e.g., mercury lamp, UV LED assembly) for curing the deposited material.

Leveling subunit 126 may include any device that may be configured to level and/or control the thickness and/or flatness of the newly formed layer by sweeping over the layer and removing excess material. For example, leveling subunit 126 may be a roller. Leveling subunit 126 may include a waste collection device (not shown) for collecting the excess material generated during the leveling process.

Supply unit 130 may include one or more building material containers or cartridges for supplying the building material(s) to print head(s) 122.

User interface 140 may be or may include input devices such as a mouse, a keyboard, a touch screen or pad or any suitable input devices and/or output devices. User interface 140 may allow a user to upload or update codes and instructions for controlling printing of 3D objects according to some embodiments of the invention and/or to upload and update files including the design of the 3D objects (e.g., computer aided design (CAD) files).

Controller 150 may include a processor 142, a memory 144 and a storage 146. Processor 142 may, for example, control the movement of printing unit 120 in a desired direction. Memory 144 may, for example, include an executable code. The executable code may include codes or instructions for controlling 3D inkjet printing system 100 to print 3D objects according to embodiments of the present invention. Storage 146 may store files that include design parameters of the 3D objects and the corresponding support structures to be printed by 3D inkjet printing system 100.

Controller 150 may control 3D inkjet printing system 100 to print layers of a 3D object 190 and layers of a support structure 180 for the 3D object, layer-by-layer, by selectively jetting the building materials, such as a modeling material and a support material, from print head(s) 122, and depositing and curing the building materials on fabrication tray 110 in multiple consecutive layers according to a predefined printing sequence as defined by a software file.

In some embodiments, when printing at least one of the multiple consecutive layers, controller 150 may cause printing unit 120 to deposit and cure the modeling material and the support material one after the other to form the respective layer of the 3D object and of the support structure, respectively, one after the other. In some embodiments, controller 150 may cause printing unit 120 to deposit and cure each of the modeling material and the support material in different deposition scans/travels of printing unit 120 when printing a layer comprising both materials.

For example, when printing a layer comprising both a modeling and a support materials, controller 150 may, at a first stage, cause printing unit 120 to deposit and cure the modeling material in one or more deposition scans/travels of printing unit 120 to form the respective layer of the 3D object. In this same example, when printing the same respective layer (e.g., at the same Z height), controller 150 may, at a second stage, cause printing unit 120 to deposit and cure the support material in one or more additional deposition scans/travels of printing unit 120 to form the respective layer of the support structure, within the same layer.

In another example, when printing a layer, controller 150 may, at a first stage, cause printing unit 120 to deposit and cure the support material in one or more deposition scans/travels of printing unit 120 to form the respective layer of the support structure. In this same example, when printing the same respective layer, controller 150 may, at a second stage, cause printing unit 120 to both deposit and cure the modeling material in one or more additional deposition scans/travels of printing unit 120 to form the respective layer of the 3D object within the same layer.

In this manner, the modeling material and support material come into contact after the materials have been fully cured, which significantly reduces the thickness of a mix layer which may form at the interface therebetween within the layer, as compared to current 3D inkjet printing methods. One example of separated temporal deposition of the modeling material and the support material during the printing of a layer comprising both materials is described hereinunder with respect to FIGS. 2A and 2B.

In some embodiments, when printing at least one of the multiple consecutive layers, controller 150 may, at a first stage, cause printing unit 120 to deposit and cure the support material and the modeling material to form a contour region of a support structure and at least a contour region of the 3D object of the respective layer, respectively, such that the contour of the support structure and at least the contour of the modeling material forming the 3D object are separated by a vacant space therebetween. In some embodiments, at the first stage, controller 150 may cause printing unit 120 to deposit the modeling material so as to form a bulk region of the 3D object layer (e.g., and not only the contour region thereof). At the first stage, controller 150 may cause printing unit 120 to deposit and cure both the modeling material and the support material forming a contour region in a layer, in one or more deposition scans/travels of printing unit 120.

Yet in these embodiments, when printing the same respective layer, at a second stage, controller 150 may cause printing unit 120 to deposit and cure at least one of the support material, the modeling material or a combination thereof in the vacant space. At the second stage, controller 150 may cause printing unit 120 to deposit and cure both the modeling material and the support material during one or more deposition scans/travels of printing unit 120.

Yet in these embodiments, when printing a layer comprising both materials, at a third stage, controller 150 may further cause printing unit 120 to deposit and cure the support material so as to form a bulk region of the support structure. In some embodiments, e.g., when only the contour region of the 3D object is being formed at the first stage, controller 150 may, at the third stage, cause printing unit 120 to deposit and cure the modeling material so as to form the bulk region of the 3D object. In some embodiments, at the third stage, controller 150 may cause printing unit 120 to deposit and cure both the modeling material and the support material during one or more deposition scans/travels of printing unit 120.

In some embodiments, when printing at least one of the multiple consecutive layers, controller 150 may, at a first stage, cause printing unit 120 to deposit and cure the support material to form a contour region of a support structure. In some embodiments, at the second stage, controller 150 may cause printing unit 120 to deposit and cure the modeling material and the support material so as to form a bulk region of the 3D object layer and a bulk region of the support structure, on either side of the support structure contour region, in one or more deposition scans/travels of printing unit 120.

This may significantly reduce the thickness of a mix layer which may form at the interface between the modeling material and the support material during the printing of the 3D object as compared to current 3D inkjet printing methods. One example of separated spatial deposition of the modeling material and the support material during the printing of a layer comprising both materials is described hereinunder with respect to FIGS. 3A and 3B.

In some embodiments, 3D inkjet printing system 100 may include a housing 160. Housing 160 may envelope at least fabrication tray 110 and printing unit 120 of 3D inkjet printing system 100. Housing 160 may include a printing chamber 162 within which the printing process of the 3D object and the support structure may be performed. In some embodiments, housing 160 is impermeable to gases and/or moisture.

Controller 150 may be configured to provide controllable environmental conditions within printing chamber 162 during the printing of the 3D object and the support structure.

In some embodiments, controller 150 may control a concentration of oxygen in printing chamber 162 to be in a predefined oxygen concentration range. In some embodiments, the predefined oxygen concentration range may be 1% to 10%, 2% to 8%, or 3% to 5%. Polymerization of the modeling material and of the support material in an inert atmosphere having an oxygen concentration in a range of 1% to 10% may be significantly faster than polymerization thereof in an ambient atmosphere having an oxygen concentration of 20% or more. Accordingly, depositing and curing the modeling material and the support material within printing chamber 162 having an inert internal atmosphere may decrease a thickness of the mix layer at the interface between the modeling material and the support material as compared to 3D inkjet printing methods that are typically performed in ambient atmospheric conditions.

In some embodiments, 3D inkjet printing system 100 may include an inert gas (e.g., nitrogen) source 172. Inert gas source 172 may, for example, include a balloon with a compressed inert gas or a gas generator configured to generate the inert gas from air. Inert gas source 172 may be in fluid communication with printing chamber 162 via a controllable valve 174. Controller 150 may open valve 174 to maintain the concentration of oxygen in printing chamber 162 within the predefined oxygen concentration range. A sensor 176 may be positioned within printing chamber 162 to provide controller 150 with information indicative of an actual concentration of oxygen in printing chamber 162. Controller 150 may control valve 174 based on readings of sensor 176 to jet inert gas from inert gas source 172 into printing chamber 162. This may, for example, compensate for an oxygen leak into printing chamber 162 from an environment external to housing 160 (e.g., where oxygen concentration is much higher than in printing chamber 162) and an inert gas leak from printing chamber 162 (where the inert gas concentration is higher than external to housing 160) external to housing 160, so as to maintain the oxygen concentration in printing chamber 162 within the predefined oxygen concentration range.

Polymerization of the modeling material and of the support material in an inert atmosphere having an oxygen concentration range of 1% to 10% may result in a raised heating of the polymerized materials as compared to polymerization thereof in ambient atmospheric conditions. This may, for example, cause over-polymerization, distortion and/or increase the thickness of the mix layer at the interface between the modeling material and the support material. In some embodiments, controller 150 may control a temperature in printing chamber 162 to be within a predefined temperature range since over-polymerization may change the mechanical properties of the cured model material. The predefined temperature range may be set, for example, to compensate for an undesired overheating of the modeling material and the support material being deposited and cured in the inert atmosphere. The predefined temperature range may be 15° C. to 35° C., for example 20° C. to 30° C., and may be regulated by injection of a cooled inert gas at a temperature of between 1° C. to 20° C., for example 5° C. to 15° C., and/or by using cooling fans.

In some embodiments, 3D inkjet printing system 100 may include a cooling system 182 having a pump. Cooling system 182 may be in fluid communication with printing chamber 162. Cooling system 182 may draw gases from printing chamber 162 via one or more outlets 184, cool the gases and return the cooled gases to printing chamber 162 via one or more inlets 186. A sensor 188 may be positioned within printing chamber 162 or within a conduit connecting inlet(s) 186 with cooling system 182 to provide controller 150 with information indicative of the temperature within printing chamber 162. Controller 150 may control cooling system 182 based on readings of sensor 188 so as to maintain the temperature in printing chamber 162 within the predefined temperature range.

The inventors have performed experiments to investigate the effect of different printing conditions on the surface parameters of the 3D object after removal of the support structure therefrom. Four sets of printing conditions have been tested.

A first set of printing conditions included a reference printing sequence and ambient atmospheric conditions having an oxygen concentration of ~20%. The reference printing sequence included deposition and curing of both the modeling material and the support material in one or more deposition scans/travels during the printing of a layer of the 3D object comprising both materials.

A second set of printing conditions included separated printing sequence and ambient atmospheric conditions. The separated printing sequence included deposition of the modeling material and the support material one after the other in different deposition scans/travels during the printing of a layer comprising both materials (e.g., as described above with respect to FIG. 1 and as described hereinunder with respect to FIGS. 2A and 2B).

A third set of conditions included a separated printing sequence (as described hereinabove) and inert atmosphere conditions having an oxygen concentration of 8%.

A fourth set of printing conditions included a separated printing sequence (as described hereinabove), inert atmospheric conditions having an oxygen concentration of 8% and a controlled atmospheric temperature of 15° C. near outlet 184.

Two different hardening subunits 124 were tested—hardening subunit 124 including a mercury lamp and hardening subunit 124 including UV LEDs.

After removal of the support structure from the 3D object, the surface of the 3D object was tested for surface roughness or inconsistencies and for impact strength.

The results of the experiments are presented in Table 1 and Table 2 below:

TABLE 1

Experimental results for hardening subunit including a mercury lamp

| | Printing Condition | Roughness [Ra, μm] | Impact strength [J/m] |
|---|---|---|---|
| 1 | Reference printing sequence Ambient atmosphere (20% O$_2$) | 15.3 | 33.2 ± 3.5 |
| 2 | Separated printing sequence Ambient atmosphere (20% O$_2$) | 11.8 | 51.7 ± 5.4 |
| 3 | Reference printing sequence Inert atmosphere (8% O$_2$) | 10.9 | — |
| 4 | Separated printing sequence Inert atmosphere (8% O$_2$) | 4.5 | 58.5 ± 9.8 |

TABLE 2

Experimental results for hardening subunit including UV LEDs

| | Printing Condition | Impact strength [J/m] |
|---|---|---|
| 1 | Reference printing sequence Ambient atmosphere (20% O$_2$) | 29 ± 9 |
| 2 | Separated printing sequence Ambient atmosphere (20% O$_2$) | 20 ± 5 |
| 3 | Reference printing sequence Inert atmosphere (8% O$_2$) | 30 ± 7 |
| 4 | Separated printing sequence Inert atmosphere (8% O$_2$) | 46.1 ± 12 |

The above measurements were obtained from a 3D printed object measuring 64*12.7*3.2 mm (X*Y*Z). The object was printed with a matte finish using a modified J750 printing system (Stratasys Ltd., Israel), VeroBlackPlus™ (Stratasys Ltd., Israel) as modeling material and SUP705™ (Stratasys Ltd., Israel) as support material.

It was found by the inventors that when a mercury lamp is used, printing of the 3D object using a separated printing sequence in an ambient atmosphere (second printing condition), and using a reference printing sequence in an inert atmosphere (third printing condition), decreases the roughness or inconsistency of the external surface of the 3D object by ~25-30% and increases the impact strength of the 3D object by ~55% as compared to printing the 3D object using the reference printing sequence in ambient atmosphere (first reference printing condition).

When a mercury lamp is used, printing of the 3D object using a separated printing sequence in inert atmosphere (fourth printing condition) decreases the roughness or inconsistency of the external surface of the 3D object by ~70%, and increases the impact strength of the 3D object by ~75% as compared to when the 3D object is printed using the reference printing sequence in ambient atmosphere (first reference printing condition).

When UV LED is used, printing of the 3D object using a separated printing sequence in ambient atmosphere (second printing condition), and using the reference printing sequence in inert atmosphere (third printing conditions), does not significantly affect the impact strength of the 3D as compared to when the 3D object is printed using the reference printing sequence in ambient atmosphere (first reference printing condition).

When UV LED is used, printing of the 3D object using a separated printing sequence in inert atmosphere (fourth printing condition) increases the impact strength of the 3D object by ~59% compared to when the 3D object is printed using the reference printing sequence in ambient atmosphere (first reference printing condition).

In either case, when a mercury lamp or a UV LED is used, it was found by the inventors that when combining separated printing sequences together with an inert atmosphere, this leads to a synergistic effect that greatly reduces the roughness of the printed object and increase its mechanical properties (e.g. impact strength).

Figures 2A, 2B:
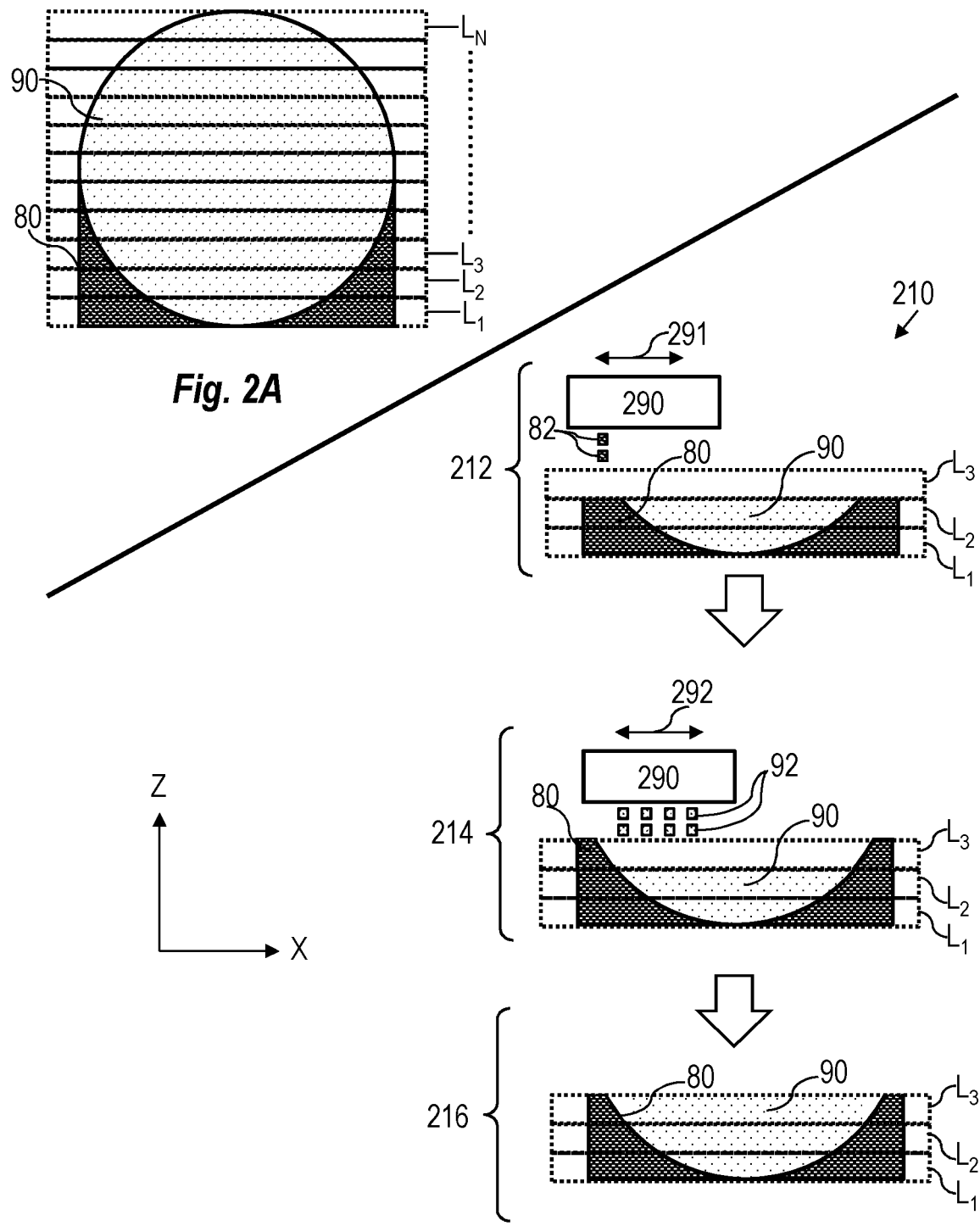
FIG. 2A is a schematic illustration of a 3D object and a support structure printable using a 3D inkjet printing system, according to some embodiments of the invention.
FIG. 2B schematically shows a process of printing a 3D object by separated temporal deposition of a modeling material and a support material during the printing of the same respective layer, according to some embodiments of the invention.

Reference is now made to FIG. 2A, which is a schematic cross-sectional illustration of a 3D object 90 (e.g., a sphere) and a support structure 80 printable using a 3D inkjet printing system (such as system 100), according to some embodiments of the invention. As schematically shown in FIG. 2A, 3D object 90 and support structure 80 may be printed in consecutive layers $L_1, L_2, L_3, \ldots, L_N$.

Reference is also made to FIG. 2B, which schematically shows a process 210 of printing a 3D object 90 by separated temporal deposition of a modeling material 92 and a support material 82, during the printing of a layer comprising both materials, according to some embodiments of the invention.

At a first stage 212, when printing a layer such as layer $L_3$, a controller (e.g., controller 150 as described hereinabove) may cause a printing unit 290 (120) of a 3D inkjet printing system to deposit and cure support material 82 in one or more deposition scans/travels 291 of printing unit 290 (120). In embodiments shown in FIG. 2B, only support material 82 is being deposited and cured during deposition scans/travels 291 of printing unit 290 (120) during first stage 212.

At a second stage 214, when printing a layer comprising both materials such as layer $L_3$, the controller may cause printing unit 290 (120) to deposit and cure modeling material 92 in one or more additional deposition scans/travels 292 of the printing unit 290 (120). In embodiments shown in FIG. 2B, only modeling material 92 is being deposited and cured during deposition scans/travels 292 of printing unit 290 (120) during second stage 214, resulting in a complete layer comprising both modeling material and support material at stage 216.

In another alternative example, modeling material 92 may be deposited at first stage 212 during one or more deposition scans/travels 291 of printing unit 290 (120) and support material 82 may be deposited at second stage 214 during one or more additional deposition scans/travels 292 of printing unit 290 (120).

Reference is now made to FIG. 3A, which is a schematic cross-sectional illustration of a 3D object 90 (e.g., a sphere) and a support structure 80 printable using a 3D inkjet printing system (such as system 100), according to some embodiments of the invention. As schematically shown in FIG. 2A, 3D object 90 and support structure 80 may be printed in consecutive layers $L_1, L_2, L_3, \ldots, L_N$.

Reference is also made to FIG. 3B, which schematically shows a process 310 of printing a 3D object 90 by separated spatial deposition of a modeling material 92 and support material 82 during the printing of a layer comprising both materials, according to some embodiments of the invention.

At a first stage 312, when printing a layer such as layer $L_3$, the controller (such as controller 150) may cause printing unit 390 (120) of a 3D inkjet printing system to deposit and cure a support material 82 and a modeling material 92 to form a contour region 84 of support structure 84 and at least a contour region 94 of 3D object 90, respectively, such that contour region 84 of support structure 80 and at least contour region 94 of 3D object 90 are separated by a vacant space 70 therebetween. In some embodiments, at first stage 312, the controller may cause printing unit 390 (120) to deposit the modeling material so as to form a bulk region 96 of 3D object 90 within the layer (e.g., and not only contour region 94 thereof). During first stage 312, the controller may cause printing unit 390 (120) to deposit and cure both modeling material 92 and support material 82 during one or more deposition scans/travels 291 of printing unit 390 (120).

At a second stage 314, when printing a layer comprising both materials such as layer $L_3$, the controller may cause printing unit 390 (120) to deposit and cure at least one of support material 82, modeling material 92 or a combination thereof within vacant space 70. During second stage 314, the controller may cause printing unit 390 (120) to deposit and cure both modeling material 92 and support material 82 during one or more deposition scans/travels of printing unit 390 (120).

At a third stage 316, when printing a layer comprising both materials such as layer $L_3$, the controller may further cause printing unit 390 (120) to deposit and cure support material 82 so as to form a bulk region 86 of support structure 80. In some embodiments, e.g., when only contour region 94 of 3D object 90 is being formed at first stage 312, the controller may, at third stage 316, cause printing unit 390 (120) to deposit and cure modeling material 92 so as to form bulk region 96 of 3D object 90. In some embodiments, during third stage 316, the controller may cause printing unit 390 to deposit and cure both modeling material 92 and support material 82 during one or more deposition scans/travels of printing unit 390 (120). The above process results in a complete layer $L_3$, as shown in stage 318.

Figure 4A:
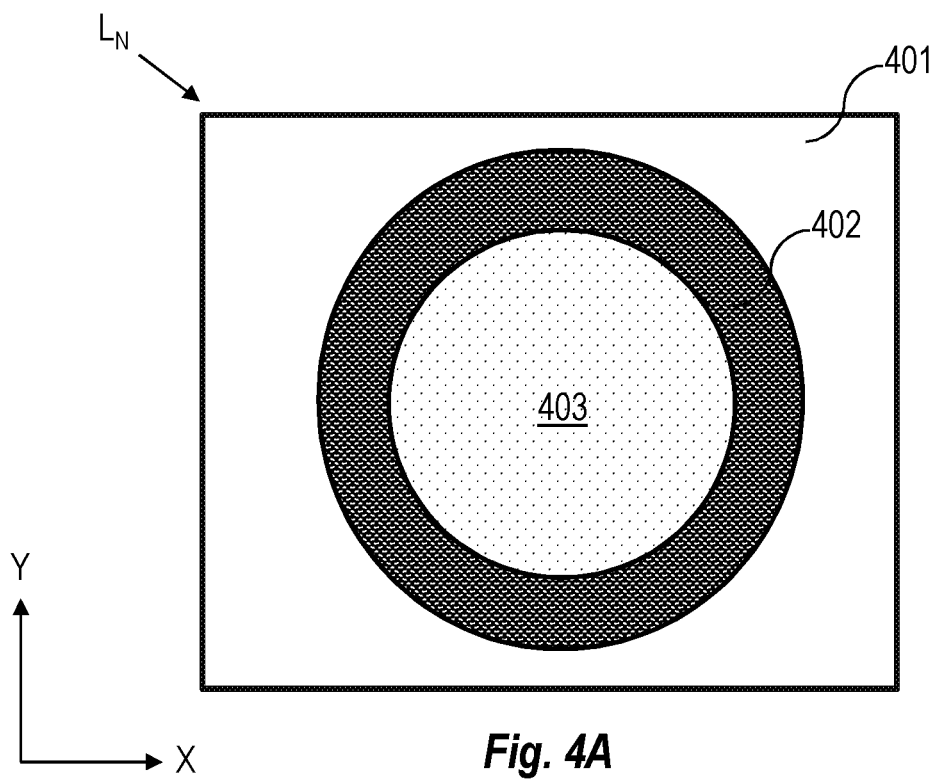
FIG. 4A is a schematic illustration of an exemplary layer of a spherical object printed according to some embodiments of the invention.

Reference is now made to FIG. 4A, which is a schematic illustration of an exemplary layer $L_N$ of a spherical object printed according to some embodiments of the invention. The layer $L_N$ includes a bulk region of modeling material 403, a bulk region of support material 402, and a region with no material being printed 401. In some embodiments, a printing sequence of layer $L_N$ may include a first stage wherein a first bulk region (either of modeling material 403 or of support material 402) is deposited and cured, and a second stage wherein the second remaining bulk region is deposited and cured.

Figure 4B:
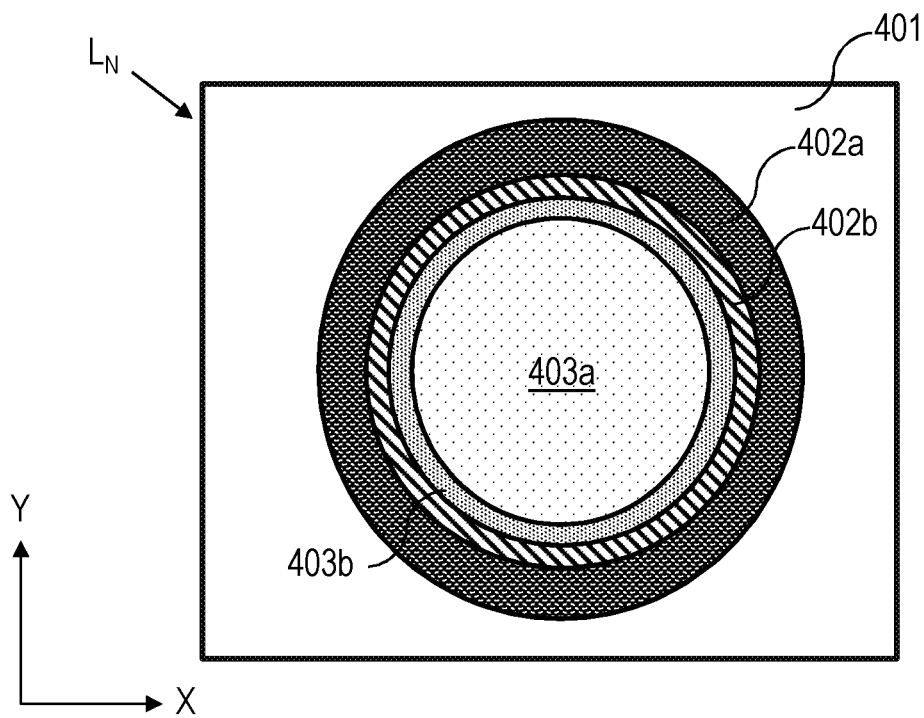
FIG. 4B is a schematic illustration of an exemplary layer of a spherical object printed according to some other embodiments of the invention.

Reference is now made to FIG. 4B, which is a schematic illustration of an exemplary layer $L_N$ of a spherical object printed according to some other embodiments of the invention. The layer $L_N$ includes a bulk region of modeling material 403a, a contour region of modeling material 403b, a bulk region of support material 402a, a contour region of support material 402b, and a region with no material being printed 401. In some embodiments, a printing sequence of layer $L_N$ may include a first stage wherein the bulk region of modeling material 403a and the contour region of support material 402b are deposited and cured, and a second stage wherein the bulk region of support material 402a and the contour region of modeling material 403b are deposited and cured. In some other embodiments, a printing sequence of layer $L_N$ may include a first stage wherein the contour region of modeling material 403b is deposited and cured, a second stage wherein the contour region of support material 402b is deposited and cured, a third stage wherein the bulk region of modeling material 403a is deposited and cured, and a fourth stage wherein the bulk region of support material 402b is deposited and cured. Optionally, the third stage and fourth stage described previously may be combined into one single stage. According to some embodiments of the present invention, the width of each of contour regions 402b and 403b is typically between 0.1 mm and 1 mm, between 0.2 mm and 0.8 mm or between 0.3 mm and 0.5 mm. In some other embodiments, the width of each contour regions 402b and 403b is below 1 mm or below 0.5 mm.

Figure 5:
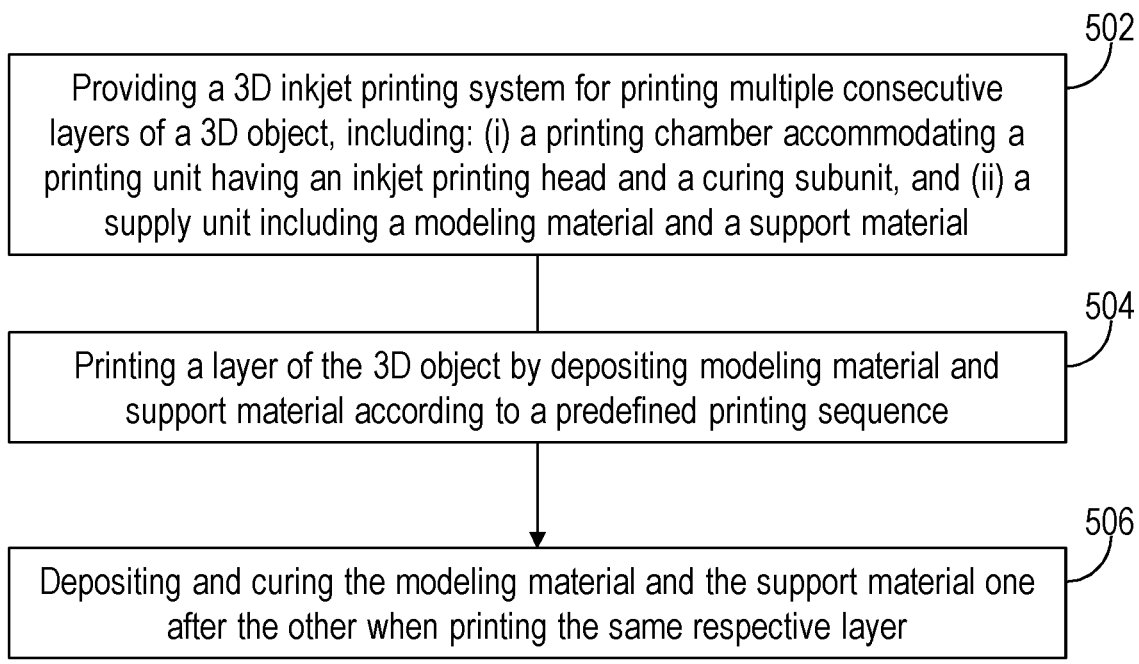
FIG. 5 is a flowchart of a method of printing a 3D object by separated temporal deposition of a modeling material and a support material during the printing of the same respective layer, according to some embodiments of the invention.

Reference is now made to FIG. 5, which is a flowchart of a method of printing a 3D object by separated temporal deposition of a modeling material and a support material during the printing of a layer comprising both materials, according to some embodiments of the invention.

The method may include in step 502 providing a 3D inkjet printing system for printing multiple consecutive layers of a 3D object, including: (i) a printing chamber accommodating a printing unit having an inkjet printing head and a curing subunit, and (ii) a supply unit including a modeling material and a support material. For example, 3D inkjet printing system 100 as described hereinabove with respect to FIG. 1.

The method may progress to step 504, including printing a layer of the 3D object by depositing modeling material and support material according to a predefined printing sequence.

In some embodiments, for at least one of the multiple consecutive layers, the predefined printing sequence for a layer comprising both modeling and support materials may include 506: depositing and curing the modeling material and the support material one after the other when printing the same respective layer. For example, as described above with respect to FIG. 1 and FIGS. 2A and 2B.

In some embodiments, for at least one of the multiple consecutive layers, the predefined printing sequence for a layer comprising both modeling and support materials may include depositing and curing each of the modeling material and the support material in different deposition scans/travels of the printing unit (such as printing unit 120) when printing the same respective layer. For example, as described above with respect to FIG. 1 and FIGS. 2A and 2B.

In some embodiments, for at least one of the multiple consecutive layers, the predefined printing sequence for a layer comprising both modeling and support materials may include, at a first stage, depositing and curing the modeling material in one or more deposition scans/travels of the printing unit, and, at a second stage, depositing and curing the support material in one or more additional deposition scans/travels of the printing unit. For example, as described above with respect to FIG. 1 and FIGS. 2A and 2B.

In some embodiments, for at least one of the multiple consecutive layers, the predefined printing sequence for a layer comprising both modeling and support materials may include, at a first stage, depositing and curing the support material in one or more deposition scans/travels of the printing unit, and, at a second stage, depositing and curing the modeling material in one or more additional deposition scans/travels of the printing unit. For example, as described above with respect to FIG. 1 and FIGS. 2A and 2B.

Some embodiments may include controlling a concentration of oxygen in the printing chamber to be in a predefined oxygen concentration range of 1% to 10%, 2% to 8%, or 3% to 5%. For example, as described above with respect to FIG. 1.

Some embodiments may include controlling a temperature in the printing chamber to be in a predefined temperature range of 15° C. to 35° C., for example 20° C. to 30° C. For example, as described hereinabove.

Some embodiments may include controlling an atmosphere in the printing chamber to be, for example, an inert atmosphere having an oxygen concentration in a range of 1% to 10%, 2% to 8%, or 3% to 5%, as described hereinabove.

Figure 6:
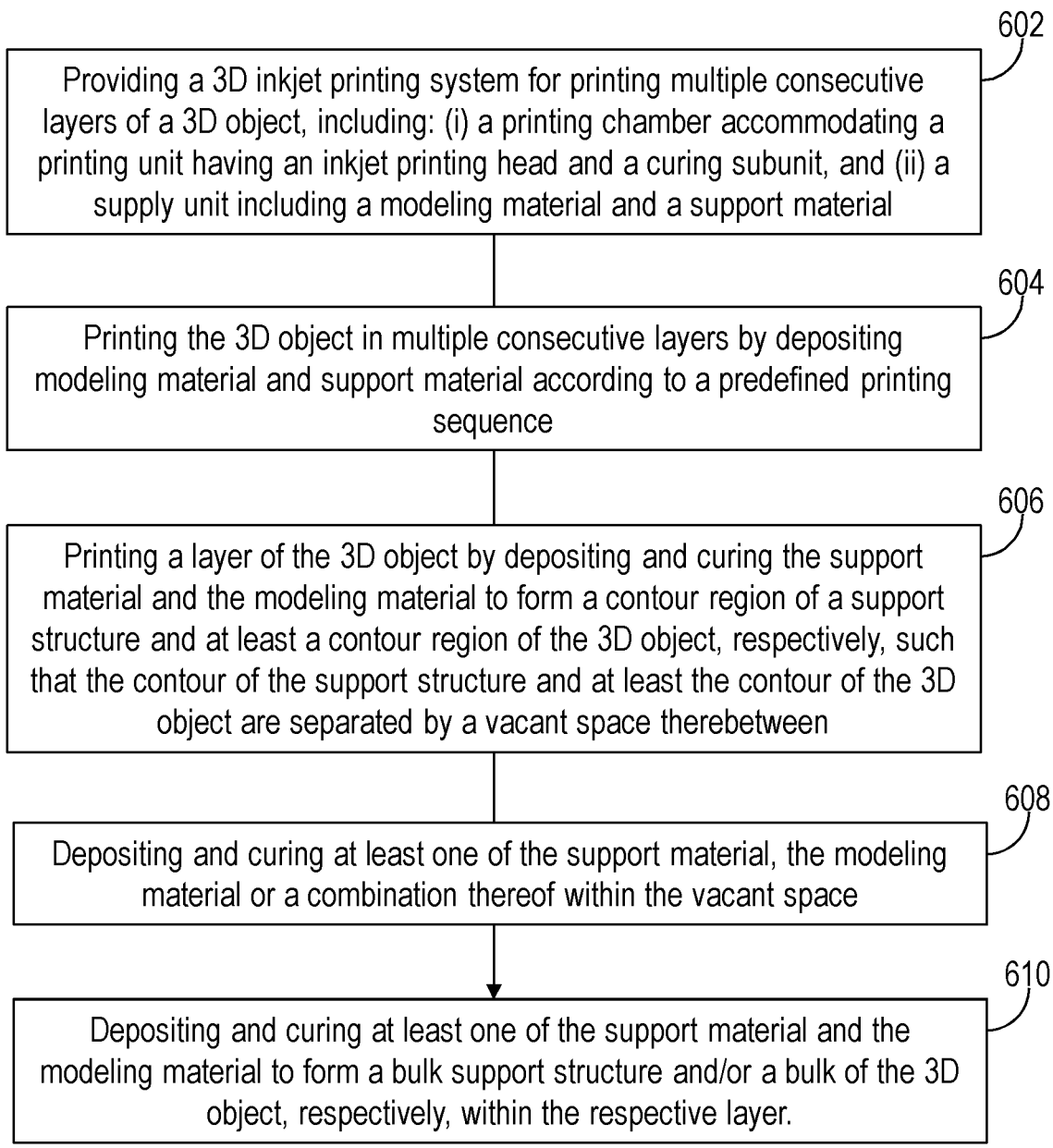
FIG. 6 is a flowchart of a method of printing a 3D object by separated spatial deposition of a modeling material and a support material during the printing of the same respective layer, according to some embodiments of the invention.

Reference is now made to FIG. 6, which is a flowchart of a method of printing a 3D object by separated spatial deposition of a modeling material and a support material during the printing of a layer comprising both materials, according to some embodiments of the invention.

The method may include providing in step 602 a 3D inkjet printing system for printing multiple consecutive layers of a 3D object, including: (i) a printing chamber accommodating a printing unit (such as printing unit 120) having an inkjet printing head and a curing subunit, and (ii) a supply unit including a modeling material and a support material. For example, 3D inkjet printing system 100 as described above with respect to FIG. 1.

The method may progress to step 604, printing the 3D object in multiple consecutive layers by depositing modeling material and support material according to a predefined printing sequence. For example, as described above with respect to FIG. 1 and FIGS. 3A and 3B.

In some embodiments, for at least one of the multiple consecutive layers the predefined printing sequence for a layer comprising both modeling and support materials may progress to step 606, at a first stage, to printing a layer of the 3D object by depositing and curing the support material and the modeling material to form a contour region of a support structure and at least a contour region of the 3D object, respectively, such that the contour of the support structure and at least the contour of the 3D object are separated by a vacant space therebetween. For example, as described above with respect to FIG. 1 and FIGS. 3A and 3B.

In some embodiments, for at least one of the multiple consecutive layers the predefined printing sequence for a layer comprising both modeling and support materials may progress to step 608, including, at a second stage, depositing and curing at least one of the support material, the modeling material or a combination thereof in the vacant space. For example, as described above with respect to FIG. 1 and FIGS. 3A and 3B.

In some embodiments, for at least one of the multiple consecutive layers the predefined printing sequence for a layer comprising both modeling and support materials may include depositing and curing the modeling materials so as to form a bulk region of the 3D object. For example, as described above with respect to FIG. 1 and FIGS. 3A and 3B.

In some embodiments, for at least one of the multiple consecutive layers the predefined printing sequence for a layer comprising both modeling and support materials may include depositing and curing the support material so as to form a bulk region of the support structure. For example, as described above with respect to FIG. 1 and FIGS. 3A and 3B.

In some embodiments, for at least one of the multiple consecutive layers the predefined printing sequence for a layer comprising both modeling and support materials may include depositing and curing both the modeling material and the support material in one or more deposition scans/travels of the printing unit (such as printing unit 120). For example, as described above with respect to FIG. 1 and FIGS. 3A and 3B.

That is, for example, in step 610, depositing and curing at least one of the support material and the modeling material to form a bulk support structure and/or a bulk of the 3D object, respectively, within the respective layer.

Some embodiments may include controlling a concentration of oxygen in the printing chamber to be in a predefined oxygen concentration range of 1% to 10%, 2% to 8%, or 3% to 5%, for example, as described hereinabove.

Some embodiments may include controlling a temperature in the printing chamber to be in a predefined temperature range of 15° C. to 35° C., or 20° C. to 30° C., for example, as described hereinabove.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of printing a three-dimensional (3D) object, the method comprising:
   providing a 3D inkjet printing system comprising:
   (i) a printing chamber accommodating a printing unit having an inkjet printing head and a curing subunit,
   (ii) a supply unit including a modeling material and a support material,
   (iii) an inert gas source in fluid communication with the printing chamber, and
   (iv) a controller configured to control deposition and curing of the modeling material and of the support material in multiple consecutive layers according to a predefined printing sequence that specifies the order of deposition and curing for the modeling material and for the support material, and configured to control:
      a concentration of oxygen in the printing chamber to be within a predefined oxygen concentration range below its content in the ambient atmosphere, and
      a temperature in the printing chamber to be in a predefined temperature range by injection of a cooled inert gas at a temperature of 1° C. to 20° C., and
   printing the 3D object in multiple consecutive layers according to the predefined printing sequence,
   wherein deposition and curing of the modeling material and deposition and curing of the support material are carried out separately from each other, such that the modeling material and the support material come into contact only after both of the modeling material and the support material have been fully cured.

2. The method of claim 1, wherein the 3D inkjet printing system further comprises a controllable valve and a sensor providing readings indicative of a concentration of oxygen in the printing chamber, and wherein the controller controls the valve to jet inert gas from the inert gas source into the printing chamber based on readings of the sensor.

3. The method of claim 1, wherein the inert gas source comprises a balloon with a compressed inert gas, or a gas generator configured to generate the inert gas from air.

4. The method of claim 1, wherein the 3D inkjet printing system further comprises a cooling system in fluid communication with the printing chamber.

5. The method of claim 4, wherein the cooling system draws gases from the printing chamber via one or more outlets, cools the gases and returns the cooled gases to the printing chamber via one or more inlets.

6. The method of claim 1, wherein the inert gas comprises nitrogen.

7. The method of claim 2, wherein the sensor is positioned within the printing chamber.

8. The method of claim 1, wherein the predefined oxygen concentration is 1% to 10%.

9. The method of claim 1, wherein the predefined temperature range is 15° C. to 35° C.

10. The method of claim 4, wherein the cooling system comprises a pump.

11. The method of claim 4, wherein the cooling system is in fluid communication with the printing chamber.

12. The method of claim 4, wherein the cooling system draws gases from the printing chamber via one or more outlets, cools the gases and returns the cooled gases to the printing chamber via one or more inlets.

13. The method of claim 1, wherein for at least one of the multiple consecutive layers the predefined printing sequence for the consecutive layer includes depositing and curing the modeling material and the support material one after the other.

14. The method of claim 13, wherein for at least one of the multiple consecutive layers the predefined printing sequence for the consecutive layer includes depositing and curing each of the modeling material and the support material in different deposition scans/travels of the printing unit.

15. The method of claim 13, wherein for at least one of the multiple consecutive layers the predefined printing sequence for the consecutive layer includes: at a first stage, depositing and curing the modeling material in one or more deposition scans/travels of the printing unit, and at a second stage, depositing and curing the support material in one or more additional deposition scans/travels of the printing unit.

16. The method of claim 13, wherein for at least one of the multiple consecutive layers the predefined printing sequence for the consecutive layer includes: at a first stage, depositing and curing the support material in one or more deposition scans/travels of the printing unit, and at a second stage, depositing and curing the modeling material in one or more additional deposition scans/travels of the printing unit.

17. The method of claim 1, wherein for at least one of the multiple consecutive layers the predefined printing sequence for the consecutive layer includes: at a first stage, depositing and curing the support material and the modeling material to form a contour region of a support structure and at least a contour region of the 3D object of the respective layer, respectively, such that the contour of the support structure and at least the contour of the 3D object are separated by a vacant space therebetween; and at a second stage, depositing and curing at least one of the support material and the modeling material in the vacant space.

18. The method of claim 17, wherein for at least one of the multiple consecutive layers the predefined printing sequence for the consecutive layer further includes depositing and curing the modeling material and/or the support material so as to form a bulk region of the 3D object.

19. The method of claim 17, wherein for at least one of the multiple consecutive layers the predefined printing sequence for the consecutive layer further includes depositing and curing both the modeling material and the support material in one or more deposition scans/travels of the printing unit.

* * * * *